(12) United States Patent
Pullini et al.

(10) Patent No.: US 9,376,538 B2
(45) Date of Patent: Jun. 28, 2016

(54) METHOD FOR THE PRODUCTION OF POLYMERIC MEMBRANES HAVING AN ORDERED ARRANGEMENT OF HIGH-ASPECT-RATIO NANOPORES, BY MEANS OF HEAVY ION BOMBING

(75) Inventors: Daniele Pullini, Turin (IT); Mauro Sgroi, Turin (IT)

(73) Assignee: C.R.F. SOCIETA CONSORTILE PER AZIONI, Orbassano (Torino) (IT)

( * ) Notice: Subject to any disclaimer, the term of this patent is extended or adjusted under 35 U.S.C. 154(b) by 795 days.

(21) Appl. No.: 13/636,000

(22) PCT Filed: Dec. 23, 2010

(86) PCT No.: PCT/IB2010/056057
§ 371 (c)(1),
(2), (4) Date: Sep. 19, 2012

(87) PCT Pub. No.: WO2011/117692
PCT Pub. Date: Sep. 29, 2011

(65) Prior Publication Data
US 2013/0011799 A1  Jan. 10, 2013

(30) Foreign Application Priority Data
Mar. 23, 2010  (EP) .................................. 10425087

(51) Int. Cl.
*C08J 7/18* (2006.01)
*B01D 67/00* (2006.01)
(Continued)

(52) U.S. Cl.
CPC ............... *C08J 7/18* (2013.01); *B01D 67/0032* (2013.01); *H01M 2/1646* (2013.01);
(Continued)

(58) Field of Classification Search
CPC ............... B01D 13/00; B01D 67/0032; B01D 2323/42; B01D 2325/02; B01D 2325/08; B01J 1/10; B41J 2/1603; B41J 2/1629; B41J 2/1639; B41J 2/1631; B41J 2/1645; B44C 1/22; C03C 15/00; C03C 25/68; C04B 41/5353
USPC ......... 156/60, 227, 345; 210/108, 321.6, 605, 210/636, 650; 216/41, 87; 430/320
See application file for complete search history.

(56) References Cited

U.S. PATENT DOCUMENTS

| 5,160,845 A * | 11/1992 | Stumbo et al. ............. 250/491.1 |
| 2005/0230353 A1 | 10/2005 | Danziger |
| 2010/0181288 A1* | 7/2010 | Tang et al. ...................... 216/45 |

FOREIGN PATENT DOCUMENTS

| EP | 1 849 516 A1 | 10/2007 |
| SU | 894 923 A1 | 4/1982 |
| WO | WO 2007051252 A1 * | 5/2007 ................. C06J 9/28 |

OTHER PUBLICATIONS

SU894923A1 Flerov et al.—Method for Producing Nuclear Filters [Apr. 30, 1982; Abstract, Machine Tanslation & Original; 9 pages].*

(Continued)

*Primary Examiner* — Dirk Bass
*Assistant Examiner* — Hayden Brewster
(74) *Attorney, Agent, or Firm* — Heslin Rothenberg Farley & Mesiti P.C.; Victor A. Cardona, Esq.

(57) ABSTRACT

A nanoporous polymeric membrane is obtained by bombing a polymer film by means of high energy focused heavy ion beams and subsequently performing chemical etching to remove the portions of the polymer film in the zones degraded by the ion bombing, in such a manner to obtain pores passing through the polymer film. The heavy ion bombing is performed after interposing between the source of ions and the polymer film, adjacent to the film, an amplitude mask having an ordered arrangement of nanopores and having sufficient thickness to prevent the passage of the heavy ions that are not directed through the pores of said amplitude mask, in such a manner to obtain in the polymer fill an ordered arrangement of nanopores having an aspect-ratio at least exceeding 10 and preferably exceeding 100.

8 Claims, 7 Drawing Sheets

(51) Int. Cl.
*H01M 2/16* (2006.01)
*C03C 15/00* (2006.01)
*G03F 1/00* (2012.01)
*H01M 8/10* (2016.01)
*H01M 10/052* (2010.01)

(52) U.S. Cl.
CPC ......... *H01M 2/1653* (2013.01); *H01M 2/1686* (2013.01); *B01D 2323/42* (2013.01); *B01D 2325/02* (2013.01); *B01D 2325/08* (2013.01); *H01M 8/1076* (2013.01); *H01M 8/1079* (2013.01); *H01M 10/052* (2013.01); *Y02P 70/56* (2015.11)

(56) References Cited

OTHER PUBLICATIONS

Sulka (Highly Ordered Anodic Porous Alumina Formation by Self-Organized Anodizing, Nanostructured Materials in Electrochemistry, (2008).*

Furneaux et al. (The formation of controlled porosity membranes, Nature, 337 ((Jan. 12, 1989), pp. 147-149).*

Ng et al. (Deformation of anodic aluminum oxide nano-honeycombs during nanoindentation, Acta Materialia, 57 (Mar. 26, 2009), pp. 2710-2720).*

R. Spohr, "Status of Ion Track Technology—Prospects of Single Tracks", Radiation Measurements, vol. 40, May 20, 2001, pp. 191-202. XP002598613.

Yousef H. et al., "Ion Track Enabled Multiple Wire Microvia Interconnects in Printed Circuit Boards", Nuclear Instruments & Methods in Physics Research Section—B:Beam Interactions with Materials and Atoms, Elsevier, Amsterdam, NL LNKD-DOI:10.1016/J.NIMB.2007.11.014, vol. 266, No. 8, Apr. 1, 2008, pp. 1659-1665. XP022658868.

Metz S. et al., "Polyimide Microfluidic Devices with Integrated Nanoporous Filtration Areas Manufactured by Micromachining and Ion Track Technology", Journal of Micromechanics & Microengineering, Institute of Physics Publishing, Bristol, GB LNKD-DOI:10.1088/0960-1317/14/3/002, vol. 14, No. 3, Mar. 1 2004, pp. 324-331. XP020069627.

Cuscito et al., "Nanoporous β-PVDF Membranes with Selectively Functionalized Pores", Science Direct, Nuclear Instruments and Methods in Physics Research B 265 (2007) pp. 309-313.

International Search Report (PCT/ISA/210 & PCT/ISA/220) and Written Opinion (PCT/ISA/237) for corresponding PCT International Application No. PCT/IB2010/056057 dated Jun. 7, 2011, and completed on May 23, 2011.

* cited by examiner

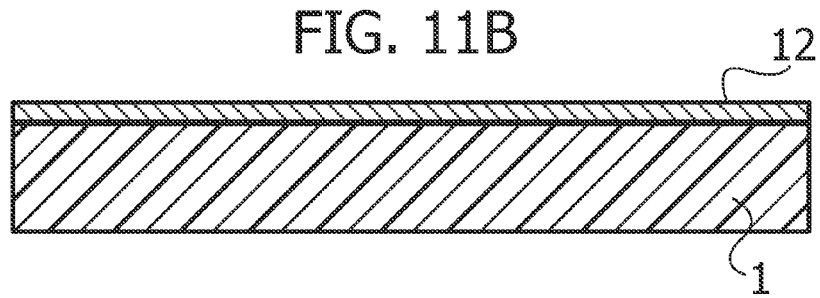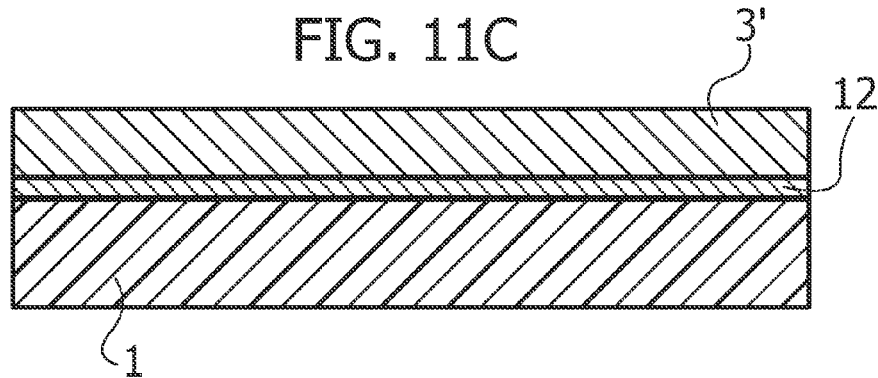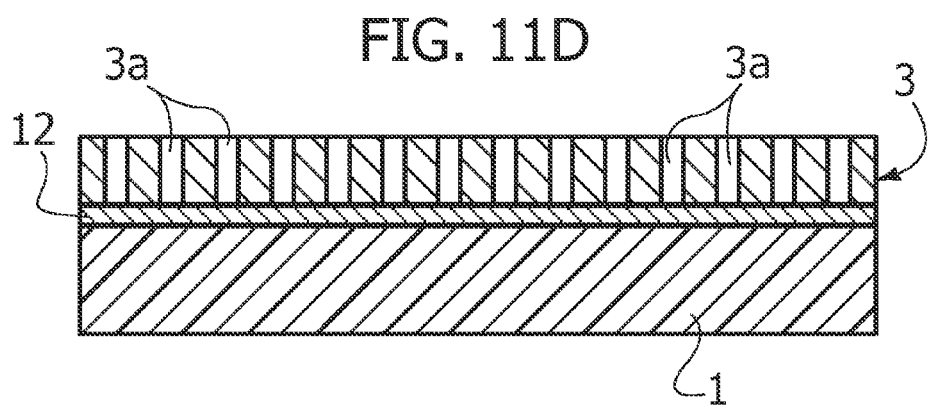

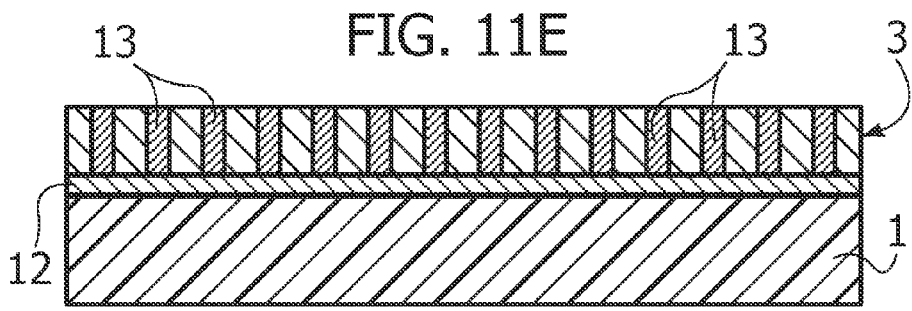
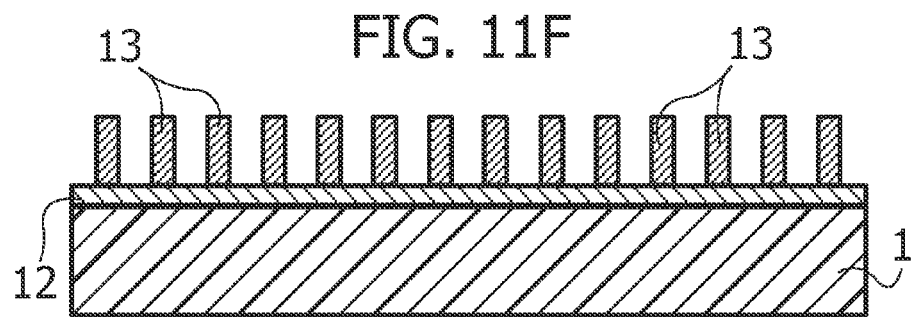
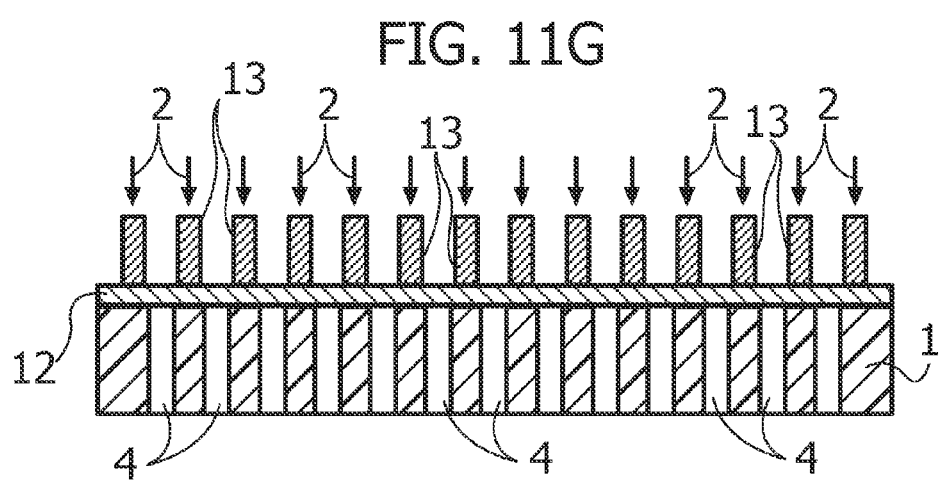
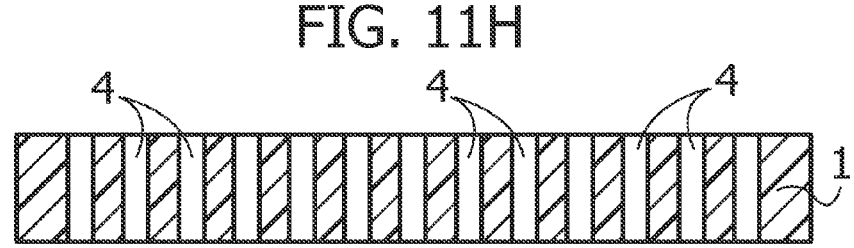

US 9,376,538 B2

METHOD FOR THE PRODUCTION OF POLYMERIC MEMBRANES HAVING AN ORDERED ARRANGEMENT OF HIGH-ASPECT-RATIO NANOPORES, BY MEANS OF HEAVY ION BOMBING

CROSS REFERENCE TO RELATED APPLICATIONS

This application is a 371 National Phase of PCT/IB2010/056057 filed on Dec. 23, 2010, which claims priority to European Patent Application No. 10425087.3 filed on Mar. 23, 2010, the entire disclosures of which are incorporated herein by reference.

BACKGROUND OF THE INVENTION

The present invention regards a method of the type indicated in the preamble of the attached claim 1. A method of this type is disclosed in SU 894 923 A1. Methods for forming nanoporous polymeric membranes without the use of a mask are disclosed in EP 1 849 516 A1 and in R.SPOHR, "Radiation measurements", vol. 40, 20 May 2001, pages 191-202. The use of a mask in the heavy ion irradiation of polymeric carriers, for producing holes which do not pass through the carrier, is disclosed in US 2005/230353 A1 as well in Yousef H. et al., "Ion track enabled multiple wire microvia interconnects in printed circuit boards" (from "Nuclear Instruments % methods in Physics Research", Section B: "Beam Interactions with Materials and Atoms", Elsevier, Amsterdam, NL—DOI: 10, 1016/J. Nimb. 2007.11.014, vol. 266, no. 8, 1 Apr. 2008 (2008-04-01), pages 1659-1665, XP022658868, ISSN: 0168-583X) and in Metz S. et al., "Polyimide microfluidic devices with integrated nanoporous filtration areas manufactured by micromachining and ion track technology" (from "Journal of Micromechanics & Microengineering, Institute of Physics Publishing, Bristol GB LNKD-DOI: 10.1088/0960-1317/14/3/002, vol. 14, no. 3, 1 Mar. 2004, pages 324-331, XP020069627 ISSN: 0960-1317).

The production of nanoporous polymeric membranes with high-aspect-ratio nanopores (i.e a value exceeding at least 10, and preferably exceeding 100, of the ratio between an axial dimension and a transverse dimension of the nanopores) and wherein the nanopores form a highly ordered arrangement, represents a technological problem yet to be solved.

The possible applications of this type of material are numerous and varied. The need for these materials lies in their possible and immediate use in existent systems and devices among which: lithium batteries separators, polymer fuel cells, filtering systems, membranes for microfluidic systems, and as an element for enabling manufacturing other nanostructured objects (nanowire sensors, nanostructured electrodes for solar cells and planar optoelectronic devices), nanostructured particles, materials made of nanocomposites and artificial metamaterials, etc.

Currently, it is possible to obtain nanoporous membranes by means of a process that provides for bombing polymer films with high energy focused heavy ion beams which degrade the material breaking the chemical bonds along the path of the ions. Subsequently to the bombing step, through a chemical etching process, it is possible to remove the material starting from the degraded zones and obtain through pores which pass through the polymer film ("Track-etched membranes"). Regarding this see R. Spohr, *Radiation Measurements*, Volume 40, 2005, pages 191-202.

Given that the accelerated ions are propagated in a beam typically through the Gaussian process, the method described above characteristically allows producing a random arrangement of through nanopores in polymer layers (for example PC, PA, PP, PBI, PVDF, PEEK, PMMA, PTFE).

The attached FIG. 1, extracted from the article "*Nanoporous β-PVDF membranes with selectively functionalized pores*", O. Cuscito, M. C. Clochard, S. Esnouf, N. Betz, D. Lairez, *Nuclear Instruments and Methods in Physics Research B*265 (2007) pages 309-313, shows an example of a membrane obtained through a method of this type.

SUMMARY OF THE INVENTION

The object of the invention is that of proposing a method capable of obtaining nanoporous polymeric membranes with high-aspect ratio pores, at least exceeding 10, and preferably exceeding 100, obtained according to an ordered arrangement, for example a honeycomb arrangement.

To obtain such object, the invention regards a method according to the attached claim 1 as well a method according to the attached claim 2.

Further advantageous characteristics of the methods according to the invention form an object of the dependent claims.

The invention exploits the properties of ordered structures such as for example the anodic porous alumina. FIG. 2 of the attached drawings shows an SEM (Scanning Electron Microscopy) image of an anodic porous alumina structure. The pores in such structure are arranged regularly according to a honeycomb arrangement, having a hexagonal symmetry. In the case of the abovementioned preferred embodiment, a sufficiently thick anodic porous alumina membrane is interposed between the polymer film and the source of ions, in such a manner that only the ions selected by the pores of the alumina reach the polymer film. Thus this allows, by suitably extending the time of exposure to the ionic beam with respect to the case wherein the alumina mask is not used, degrading the polymer film solely at the alumina pores. The step of chemical etching shall thus produce a nanoporous polymeric structure with symmetry equivalent to that of the porous alumina.

In the present description, and in the claims that follow, any holes mask or matrix used as described above is referred to as an "amplitude mask". The term "amplitude mask" is already used in the field of traditional photolithography for describing a mask encoded in such a manner to be entirely opaque, or entirely transparent, to electromagnetic radiation. In the case of the present invention, the same term is used for describing a nanoporous material, wherein the nanopores are obtained at precise positions, i.e. according to an ordered geometric arrangement. When bombing by means of heavy ion beams, the heavy ions may pass through the nanopores of the amplitude mask without the trajectory thereof being altered in a significant manner, while at the non-perforated zones of the amplitude mask the ions are not capable of passing through it.

Further characteristics and advantages of the invention shall be clear from the description that follows with reference to the attached drawings, strictly provided for exemplifying and non-limiting purposes, wherein:

BRIEF DESCRIPTION OF THE DRAWINGS

FIGS. 11A-11H show the various steps of a further variant of the method according to the invention.

FIGS. 1 and 2 have already been described above. FIG. 3 of the attached drawings refers to the prior art wherein a polymer film 1, illustrated in section in the figure, is bombed with heavy ion beams 2 in such a manner to obtain a porous membrane of the type illustrated in FIG. 1.

DETAILED DESCRIPTION OF THE DRAWINGS

Figure 1:
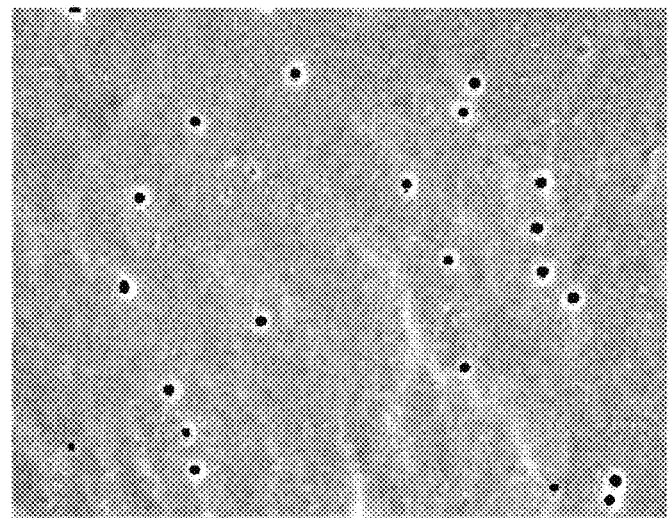
FIG. 1 has already been described above and it illustrates a nanoporous polymeric membrane with a disordered arrangement of the pores, FIG. 2, also already described above, is a microphotograph showing the structure of a layer of anodic porous alumina.
Figure 2:
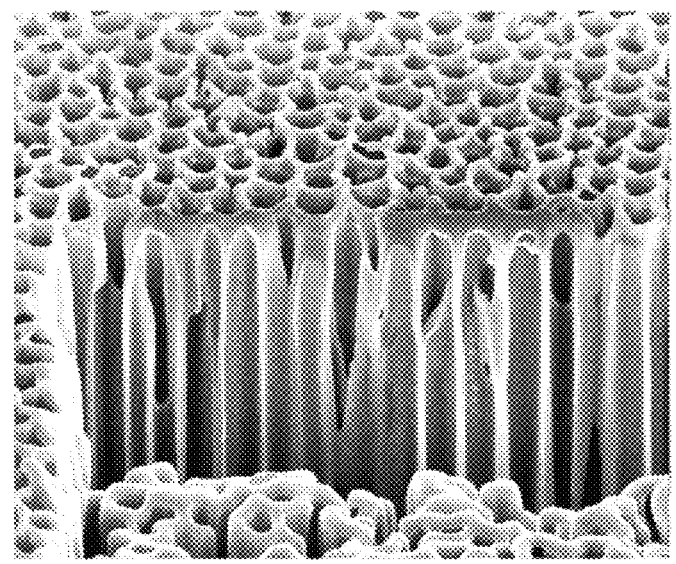
Figure 3:
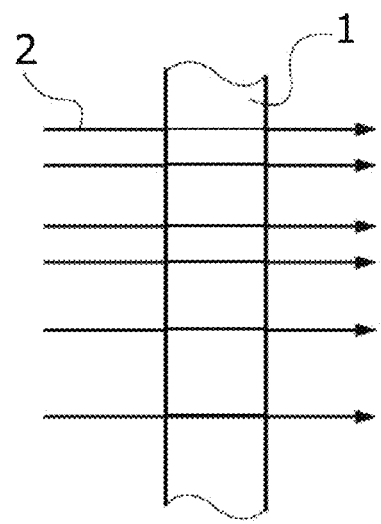
FIG. 3 is a schematic view of the method for bombing by means of heavy ion beams on a polymer film, according to the prior art.
Figure 4:
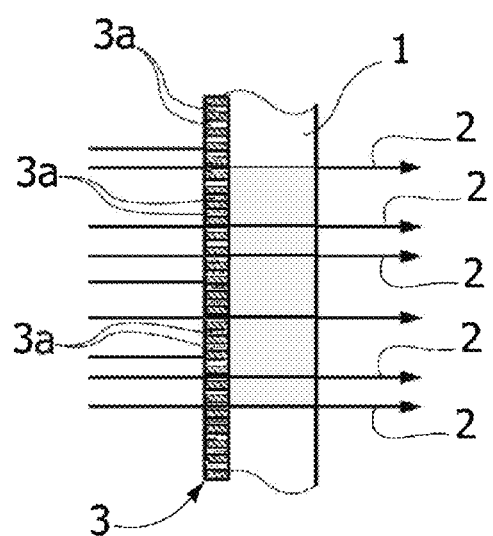
FIG. 4 is a sectional view corresponding to FIG. 3, showing the bombing step in the method according to the invention, positioned facing the polymer film of an nanoporous amplitude mask.

FIG. 4 shows the most important step of the method according to the invention, wherein a prefabricated nanoporous amplitude mask, of suitable elementary composition (metallic, polymeric, ceramic or composite), is positioned facing the polymer film 1 before bombing by means of the heavy ion beams 2. The amplitude mask, indicated in its entirety with reference number 3, has an ordered arrangement of nanopores 3a and has a thickness sufficient to prevent the passage of the heavy ions that are not directed through the pores of the amplitude mask.

As indicated above, subsequently to such operation, the polymer film is subjected to the usual etching operation, for fully removing the material at the zones degraded by the heavy ion bombing, and thus obtain a nanoporous polymeric membrane, with high-aspect ratio pores (at least exceeding 10 and preferably exceeding 100) and arranged according to an ordered arrangement, for example a honeycomb arrangement with a hexagonal symmetry.

Figure 5A:
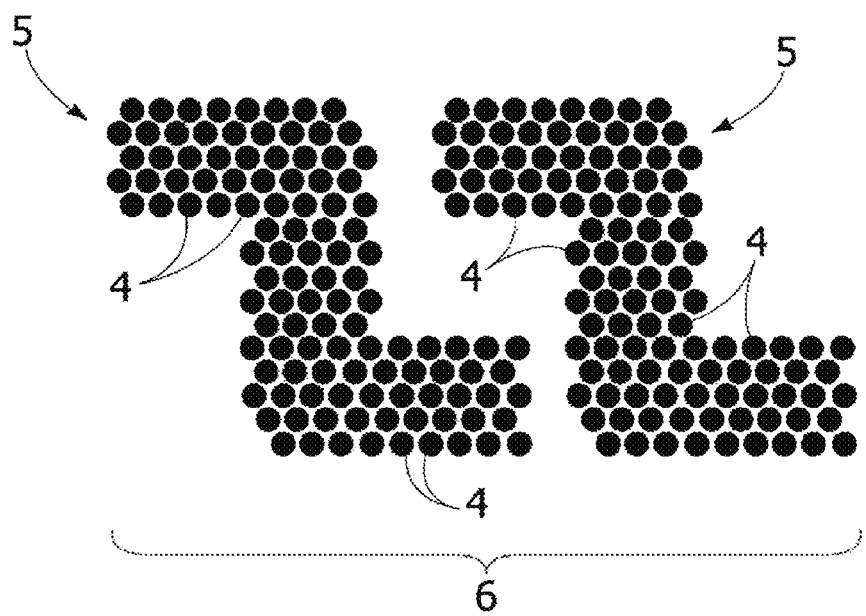
FIG. 5A shows an example of an amplitude mask.

FIG. 5A illustrates an example of an arrangement of the nanopores in the amplitude mask used in the method according to the invention. The example refers to the case of an embodiment not forming part of the invention, wherein an anodized porous alumina is used as the amplitude mask. In such case, the amplitude mask has a honeycomb nanostructure typical of the anodic porous alumina. The honeycomb-patterned nanopores 4 define microstructures 5—Z-shaped in the illustrated example—which in turn define a superstructure indicated with reference number 6.

Figure 5B:
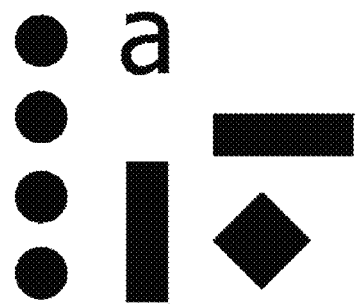
FIG. 5B shows an example of amplitude masks useable in the method according to the present invention.

FIG. 5B illustrates another example of nanostructured amplitude mask having an arbitrary geometry produced by means of "top down nanopatterning" ("Electron beam lithography", "focused ion beam milling", "nanoimprint lithography", "deep UV lithography") and "bottom up self-assembly of nanoparticles and nanowires".

Figure 6:
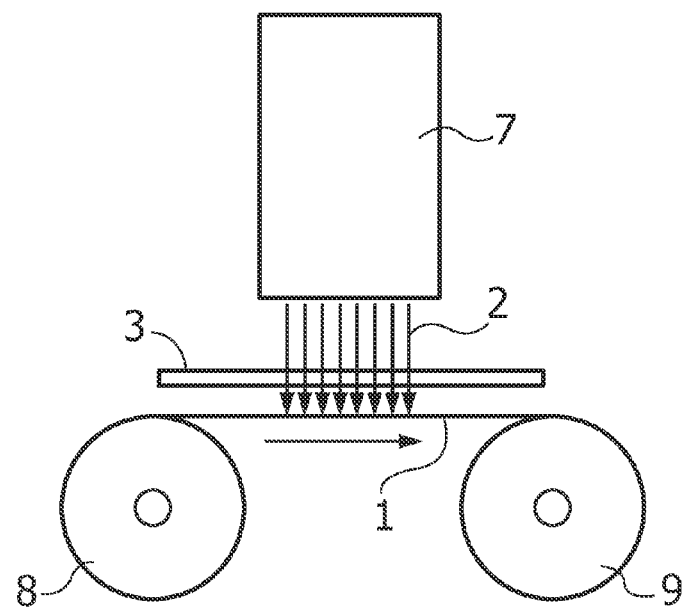
FIG. 6 shows an embodiment of the method according to the invention, wherein the polymer film is mobile during the bombing by means of heavy ion beams, FIGS. 7A, 7B schematically show a further embodiment of the method according to the invention wherein the polymer film is stationary during the bombing by means of heavy ion beams and the amplitude mask is respectively spaced or at contact with the polymer film.

FIG. 6 of the attached drawings schematically shows a first variant of the method according to the invention, wherein the polymer sheet 1 is displaced longitudinally while it is bombed by heavy ion beams 2 coming from a source of ions 7 and passing through an amplitude mask 3. The polymer film 1 is displaced longitudinally, in a plane orthogonal to the direction of the heavy ion beams 2. During the method, the amplitude mask 3 remains at a fixed position. This solution allows using the same amplitude mask 3 for several exposures and it is particularly advantageous for perforating a polymer sheet to be unwound during exposure from a roller 8 and wound on a roller 9.

Figure 7A:
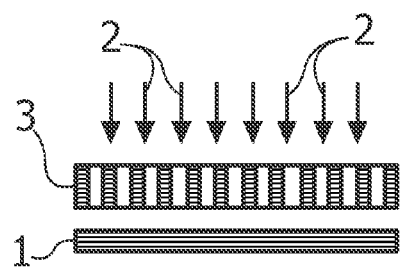
Figure 7B:
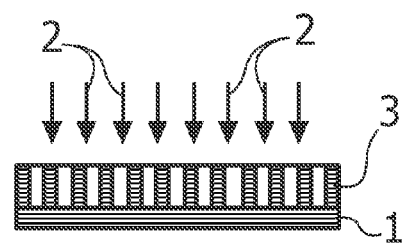

FIGS. 7A and 7B refer to the case wherein the heavy ion bombing instead is performed maintaining the polymer film 1 at a fixed position and positioning the amplitude mask 3 at a short distance from or, respectively, at contact with the film 1. The solution of FIG. 7A has the advantage of allowing reutilising the same mask 3 for several exposures and it is thus much easier to produce at industrial level. However, it may give rise to some complications related to proper alignment between the ion beam 2, the mask 3 and the polymer substrate 1. The solution of FIG. 7B guarantees correct alignment of the mask 3, but it does not allow reutilising the same.

Figure 8:
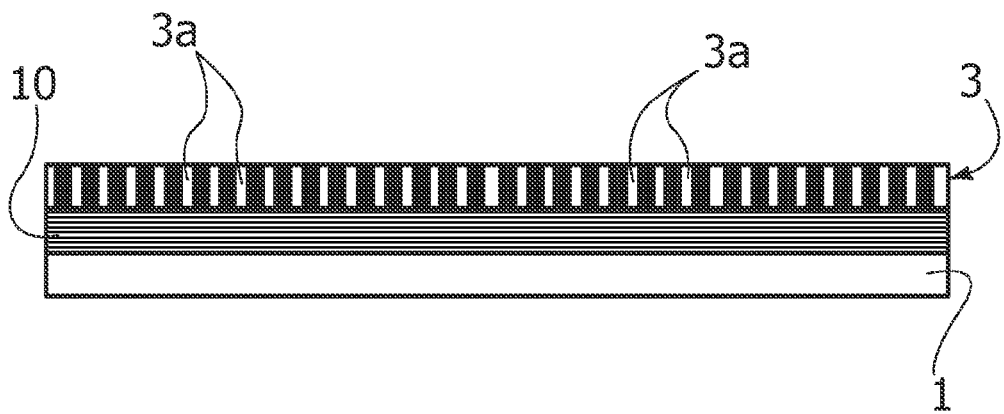
FIG. 8 illustrates a further variant wherein one layer of porous alumina is used as a template for making an amplitude mask adhered to the polymer material to be perforated.
Figure 9:
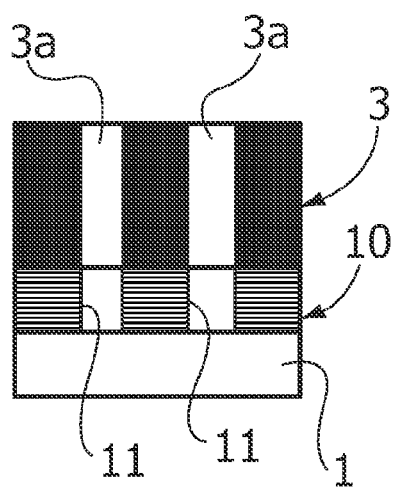
FIGS. 9, 10 illustrate the two further steps of the method according to the invention in the case of this variant.
Figure 10:
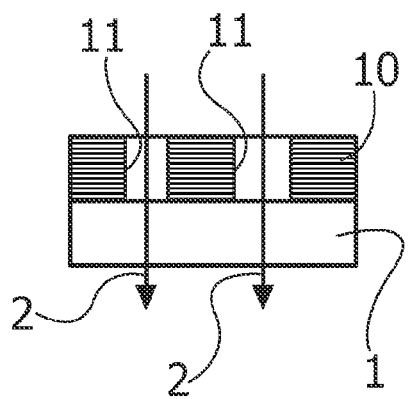

According to a first aspect of the invention, the porous alumina is used as a template for manufacturing an amplitude mask made of different material, such as for example a high intensity metal (for example copper or lead), adhered to the polymer material to be perforated. Such solution is illustrated in FIGS. 8-10. In this case, deposited on the polymer substrate 1 is a first substrate of material 10 opaque to ions. Deposited on this layer 10 is a second aluminium layer. The aluminium layer is transformed into alumina through anodisation. After eliminating, through chemical etching, a barrier layer at the bottom of the pores typical of the anodic porous alumina—in such a manner to define through channels in the porous alumina—the material forming the layer 10 is treated chemically through the pores of the anodic porous alumina, specifically for example through anisotropic etching, or through RIE (reactive ion etching), or through wet etching (in liquid phase) in case the film is tens of manometers thin, in such a manner to obtain—in the layers 10—pores 11 at the pores 3a of the anodic porous alumina 3 (FIG. 9). At this point, the layer 3 of anodic porous alumina is dissolved chemically, and thus the polymer film 1 is bombed by means of heavy ion beams 2 (FIG. 10) using the layer 10 as an amplitude mask.

According to a second aspect of the invention, the porous alumina is used as a template for manufacturing an amplitude mask made of different material. For example it is possible to deposit on the polymer film 1 (FIG. 11A) a layer conductive and transparent to the ions (e.g. gold, indium and tin oxide, etc), as illustrated in FIG. 11B. Deposited on such layer 12 is a thick aluminium layer 3' (FIG. 11C) which is subsequently anodised to form a layer 3 of anodic porous alumina (FIG. 11D), The thin conductive layer 12 may be used as an electrode for electrodepositing metal (eg. copper, lead, nickel, gold, platinum) into the pores 3a of alumina 3 (FIG. 11E), in such a manner to obtain nanowires 13 in the ceramic matrix. By dissolving alumina through chemical etching (FIG. 11F) it is possible to obtain an ordered arrangement (with hexagonal symmetry) of nanowires 13 adhering to the polymer sublayer 1 and to the layer 12. In case the length of the nanowires 13 is not excessive (in the order of a micrometer) they remain adhered to the sublayer and they do not tend to bend. The arrangement of nanowires 13 on the polymer represents the amplitude mask, complementary to that of the anodic porous alumina 3 used for manufacturing thereof, to be exposed to high energy ion beams 2 (FIG. 11G) in order to obtain the nanoporous membrane (FIG. 11H).

In the step immediately subsequent to obtaining the layer of anodic porous alumina it may be provided for eliminating, if required, the barrier layer at the bottom of the pores by means of chemical etching, in such a manner to define through channels 3a through the layer of anodic porous alumina.

However, it is also possible to deposit metals in the pores of the alumina without removing the barrier layer, through pulsed electrodeposition. The barrier layer is an alumina layer that closes the interface channels between the anodic porous alumina (APA) and the sublayer. Actually, it does not close them completely, i.e. the barrier layer does not insulate the anodisation electrochemical solution from the sublayer, otherwise the anodisation process would not progress. The barrier layer, which appears as a plug at the bottom of the pores, is perforated by percolation channels whose diameter is in the order of a nanometer and even smaller. This allows electrical continuity between the anode and cathode and the chemical reaction which transforms aluminium into alumina may occur. Whether the barrier layer is to be removed depends on the suitable balancing between adhesion (the contact area between APA and the sublayer diminishes when the barrier layer is removed) and the conductivity of the electrolytic cell. In other words, the nanowires may however, generally, be grown in "plugged" channels to the detriment of a greater cell voltage.

As clear from the description above, the idea on which the present invention is based is that of subjecting a polymer film to bombing by means of heavy ion beams by interposing an amplitude mask between the source of the ions and the polymer film with the aim of obtaining a nanoporous polymeric membrane having a highly ordered arrangement and aspect-ratio of the nanopores.

Obviously, without prejudice to the principle of the invention the construction details and embodiments may widely vary with respect to what has been described and illustrated strictly for exemplifying purposes, without departing from the scope of protection of the present invention.

The invention claimed is:

1. A method for the production of a nanoporous polymeric membrane, comprising
    positioning an opaque layer of material entirely opaque to ions over a polymer film and depositing an aluminum layer over said opaque layer, transforming said aluminum layer into anodic porous alumina by an anodisation method, the transforming forming a barrier layer inside and at a bottom of pores of the anodic porous alumina;
    eliminating the barrier layer through chemical etching, in such a manner to define channels passing through the layer of anodic porous alumina;
    chemically etching the opaque layer through the pores of the anodic porous alumina in such a manner to obtain in said opaque layer an ordered honeycomb arrangement of mask nanopores corresponding to the arrangement of the pores of the anodic porous alumina and thus forming an amplitude mask in the opaque layer;
    removing the anodic porous alumina;
    interposing the amplitude mask between a source of heavy ions and a polymer film, in proximity to the film, the amplitude mask having the ordered honeycomb arrangement of mask nanopores and thickness sufficient to prevent the passage of the heavy ions that are not directed through the mask nanopores of the amplitude mask;
    bombing the polymer film by a high energy focused heavy ion beam through the amplitude mask having the ordered honeycomb arrangement of mask nanopores, so that a corresponding ordered honeycomb distribution of polymer nanopores is obtained in said polymer film;
    performing a chemical etching of the film after the bombing to remove the portions of said film in zones degraded by the ion bombing in such a manner to obtain pores passing through the film; and
    said polymer nanopores obtained in the polymer film having an aspect-ratio at least exceeding 10.

2. A method for the production of a nanoporous polymeric membrane, comprising
    positioning a layer of gold, indium or tin oxide over a polymer film and then depositing a layer of aluminum thereon,
    transforming said aluminum layer into anodic porous alumina by means of an anodisation method,
    using the layer of gold, indium or tin oxide as an electrode for electrodepositing a metal into the pores of the anodic porous alumina, in such a manner to obtain metal nanowires in a matrix,
    dissolving the anodic porous alumina through chemical etching in such a manner to obtain an ordered distribution of nanowires adhering to a polymer sublayer and to the layer of gold, indium or tin oxide to form an amplitude mask,
    interposing the amplitude mask between a source of heavy ions and a polymer film, in proximity to the film, the amplitude mask having the ordered honeycomb arrangement of mask nanopores and thickness sufficient to prevent the passage of the heavy ions that are not directed through the mask nanopores of the amplitude mask;
    bombing the polymer film by a high energy focused heavy ion beam through the amplitude mask having the ordered honeycomb arrangement of mask nanopores, so that a corresponding ordered honeycomb distribution of polymer nanopores is obtained in said polymer film;
    performing a chemical etching of the film after the bombing to remove the portions of said film in zones degraded by the ion bombing in such a manner to obtain pores passing through the film; and
    said polymer nanopores obtained in the polymer film having an aspect-ratio at least exceeding 10.

3. The method according to claim 1, wherein the amplitude mask always remains at a fixed position with respect to the beam of heavy ions, while the polymer film is displaced in the longitudinal direction thereof, orthogonally to the beam of heavy ions.

4. The method according to claim 1, wherein the amplitude mask and the polymer film remain at fixed position during the heavy ion bombing.

5. The method according to claim 4, wherein the amplitude mask is maintained spaced from the polymer film.

6. The method according to claim 3, wherein the amplitude mask is maintained in contact with said polymer film during the heavy ion bombing.

7. The method according to claim 2, wherein the amplitude mask always remains at a fixed position with respect to the beam of heavy ions, while the polymer film is displaced in the longitudinal direction thereof, orthogonally to the beam of heavy ions.

8. The method according to claim 2, wherein the amplitude mask and the polymer film remain at fixed position during the heavy ion bombing.

* * * * *